United States Patent [19]

Stout

[11] 4,121,056

[45] Oct. 17, 1978

[54] TIME DIVISION DIGITAL MULTIPLEXER APPARATUS

[75] Inventor: James E. Stout, Raymore, Mo.

[73] Assignee: The United States of America as represented by the Secretary of the Air Force, Washington, D.C.

[21] Appl. No.: 806,435

[22] Filed: Jun. 14, 1977

[51] Int. Cl.² .............................................. H04J 9/00
[52] U.S. Cl. ........................... 179/15 BM; 179/15 BS
[58] Field of Search ........ 179/15 BS, 15 BM, 15 FD, 179/2 DP; 358/150; 178/53, 69.1

[56] References Cited

U.S. PATENT DOCUMENTS 3,746,794  7/1973  Stifle ................................. 179/2 DP
4,025,720  5/1977  Pachynski ........................... 178/69.1

Primary Examiner—Kathleen Claffy
Assistant Examiner—Joseph A. Popek
Attorney, Agent, or Firm—Joseph E. Rusz; William Stepanishen

[57] ABSTRACT

A synchronous time division digital multiplexer apparatus utilizing frequency shift keying to transmit data from a plurality of parallel input channels that are sequentially sampled and converted to serial data having non-return to zero (NRZ) characteristics. Frequency shift keying is used to modulate the obtained serial data with a sinusoidal audio carrier. Simultaneously, the system clock is automatically modulated by means of frequency shift keying with another sinusoidal audio carrier, or manually by a repetitive frame synchronization pulse. The data carrier and clock carrier are linearly combined, bandpass filtered, and level adjusted for over a voice grade transmission media.

6 Claims, 3 Drawing Figures

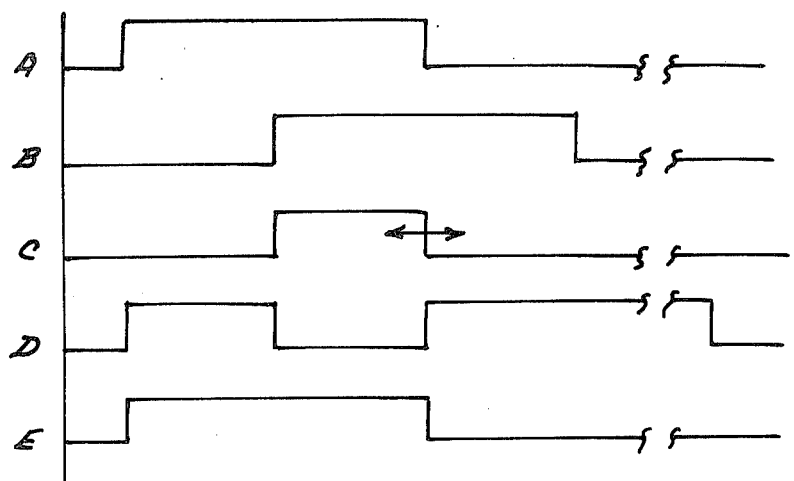
FIG 1.b
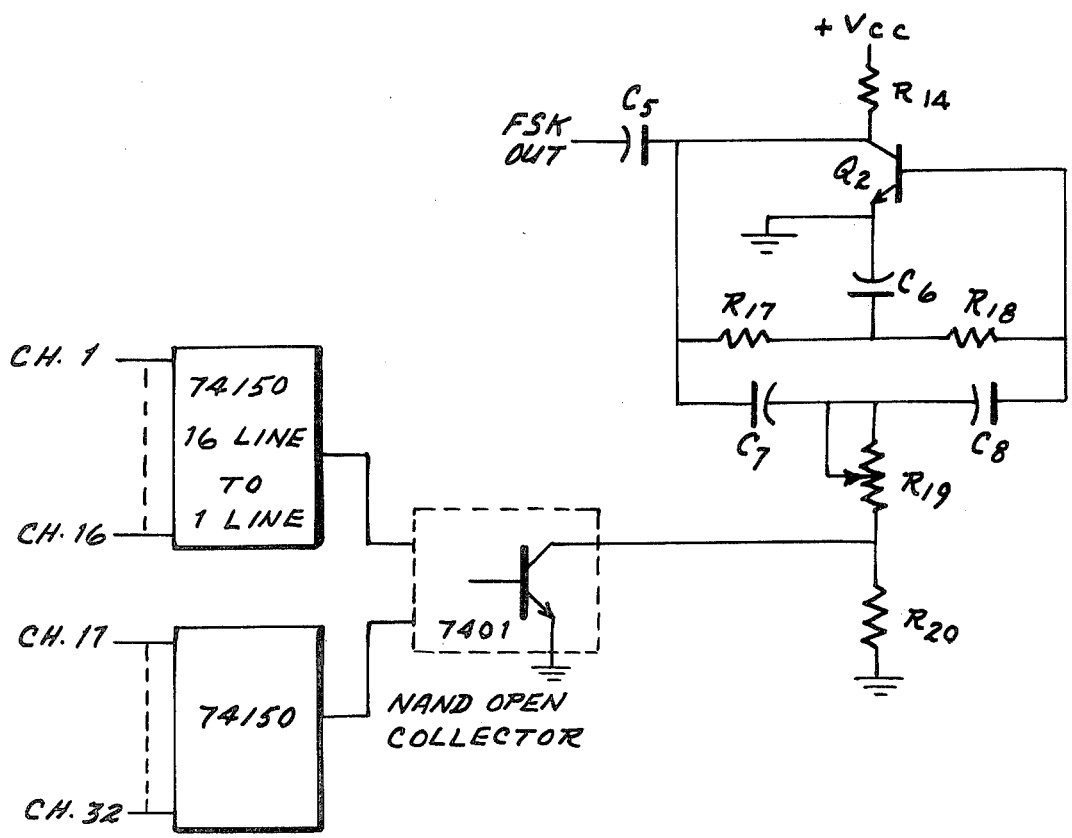
FIG.2

TIME DIVISION DIGITAL MULTIPLEXER APPARATUS

STATEMENT OF GOVERNMENT INTEREST

The invention described herein may be manufactured and used by or for the Government for governmental purposes without the payment of any royalty thereon.

BACKGROUND OF THE INVENTION

The present invention relates broadly to a data transmission system, and in particular to a synchronous time division digital multiplexer apparatus for use with a modem transmission system.

In the prior art, the transmission of digital data over telephone lines by frequency modulations-demodulation techniques is well known. Frequency modulation techniques in which a carrier wave is shifted between two frequencies during successive modulation periods are commonly called frequency shift keying frequency shift keying systems. In these prior art systems, the carrier wave is generated at the transmitter by means of well known analog techniques which utilizes resistors, inductors, etc. Analog carrier wave generators of such prior art transmitters are unstable to some degree which causes unwanted shifts in the transmitted carrier frequency. The stability of such analog circuits may be improved to some extent by the use of crystal controlled oscillators and temperature compensating devices. However, such devices are not only expensive, but do not completely eliminate the instability problem. Furthermore, the close harmonics of the carrier frequencies, for example, third and fifth, are difficult to remove and may result in errors in the demodulated signal.

SUMMARY

The present invention utilizes low speed time division digital multiplexer which is adapted to accept thirty parallel inputs that are sequentially sampled and converted to serial data having non-return to zero (NRZ) characteristics. Frequency shift keying (FSK) is utilized to modulate the obtained serial data with a sinusoidal audio carrier. Simultaneously, the system clock is automatically modulated by means of frequency shift keying with another sinusoidal audio carrier, or manually by a repetitive frame synchronization pulse entered by an operator. The data carrier and clock carrier are linearly combined, bandpass filtered, and level adjusted to be compatible with transmission in voice-grade telephone circuit in the simplex mode.

It is one object of the present invention, therefore, to provide an improved time division digital multiplexer apparatus utilizing a parallel to serial data conversion to permit the use of low speed time division multiplexing.

It is another object of the invention to provide an improved time division digital multiplexer apparatus wherein a digital to analog conversion is affected to permit the use of modems in data transmission.

It is still another object of the invention to provide an improved time division digital multiplexer apparatus utilizing frequency shift keying and repetitive frame synchronization signal to provide data transmission over voice-grade telephone circuits to a remote location.

These and other advantages, features and objects of the invention will become more apparent from the following description taken in connection with the illustrative embodiment in the accompanying drawings.

DESCRIPTION OF THE PREFERRED EMBODIMENT

Figure 1:
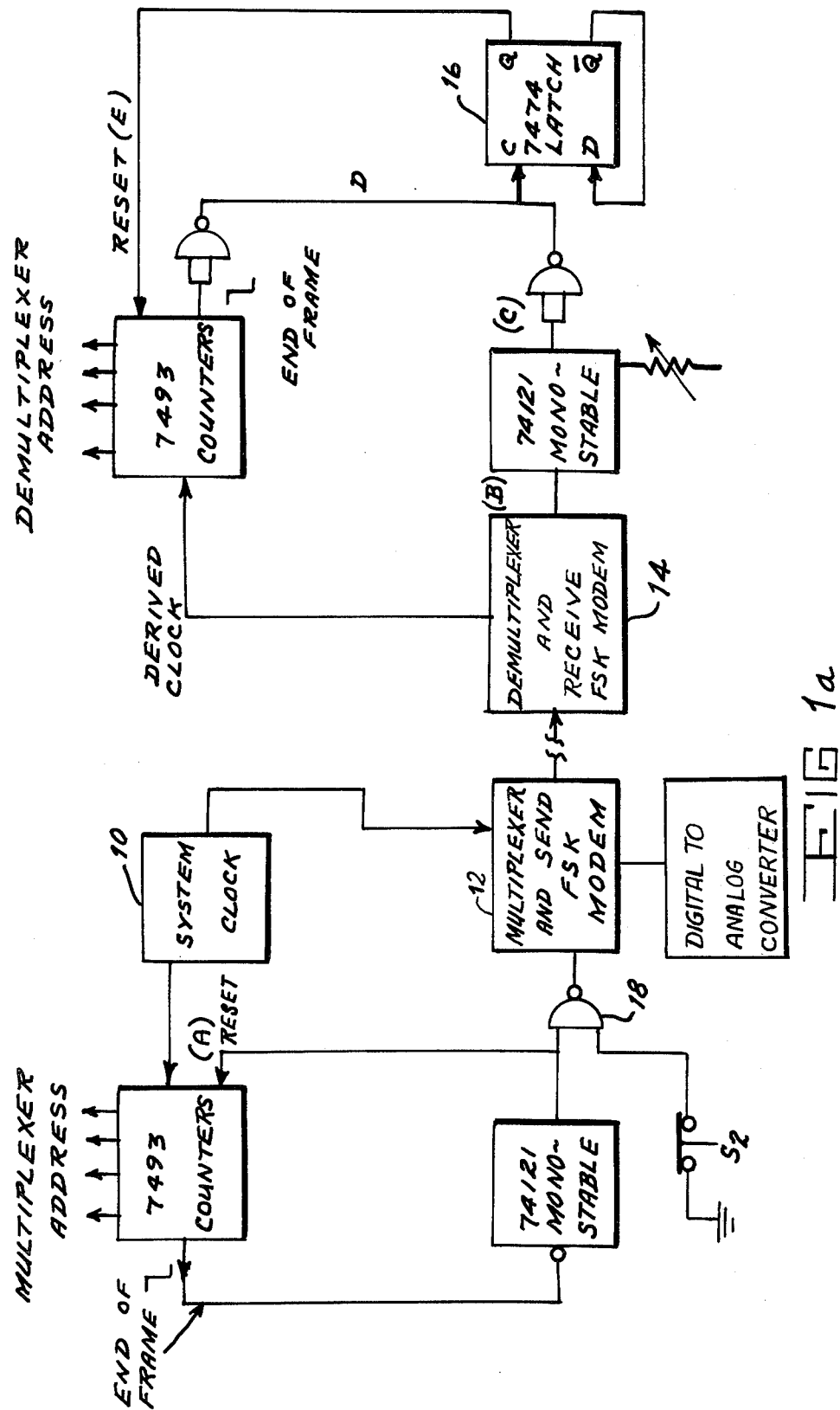
FIG. 1a is a block diagram of the delay equalization and frame synchronization in accordance with the present invention.
FIG. 1b is a graphical illustration of the signal waveforms which are present at the respective designated portions of the apparatus shown in FIG. 1a, and, FIG. 2 is a schematic diagram of the digital to analog converter utilized in the present invention.

Referring now to FIG. 1a, there is shown a synchronous time division digital multiplexer apparatus utilizing a system clock 10 for repetitive frame synchronization in data transmission betweeen modem units at remote locations with respect to each other. The multiplexer and send modem unit 12 accepts a maximum of thirty parallel inputs which may be interfaced with TTL level inputs and/or high level (to + 48V) inputs. The inputs are sequentially sampled in the time domain and converted to TTL level non-return-to-zero (NRZ) serial data. The serial data is used to modulate (frequency shift key - FSK) a sinusoidal audio carrier. Simultaneously, another sinusoidal audio carrier from the system clock unit 10 is FSK modulated by a data enter pulse at the operator's discretion by switch, S2 or, alternatively, the clock carrier may automatically and periodically be modulated by a repetitive frame synchronization pulse. Within the modem portion of unit 12, the data carrier and clock carrier are linearly combined, bandpass filtered, and level adjusted for compatibility with dedicated military or commercial voice-grade transmission media, simplex mode. The send modem output level is adjustable to −3 dbm maximum.

The receive modem, which is part of the demultiplexer and receive modem 14, has a sensitivity threshold of −30 dbm and, isolates the previously combined data and clock carriers, and then performs conventional FM demodulation. The receive Modem outputs include NRZ serial data, frame synchronization pulses (when selected by the operator), and fully synchronous, phase-locked system clock. The NRZ serial data is distributed via buffer stages to TTL type 7474 latches 16 where it is applied simultaneously to all latch data inputs. Serial to parallel conversion is accomplished by strobing the 7474 clock inputs in time sequence, each strobe coinciding in time with the serial data channel to be decoded. In this manner, each of the thirty latch outputs is a TTL-level reproduction of the digital input to the corresponding channel at the multiplexer input. Latch outputs are buffered in a high level interface compatible with other TTL or high level loads to + 48V.

The delay equalization and frame synchronization is achieved by automatically disabling the strobe generator 18 (TTL 74154) at the end of frame (EOF) time. The demultiplexer remains passive, with no updating of stored data, until a synchronizing (or Data Enter) pulse is generated at the send end and recovered at the receive end. This pulse is conditioned by means of a single adjustment to enable resumption of strobe generation at the precise time required to compensate for clock/data delay differences.

The multiplexer system clock is derived from the voltage controlled oscillator output of a type 560 phase lock loop (PLL) in the receive modem. This phase lock loop is locked in frequency and phase to the system clock in the send terminal and coherently tracks inadvertent frequency drift as well as desired FSK modulation. The phase track loop tracking capability permits use of an economical, noncritical system clock oscillator with no degradation in system reliability.

There is shown in FIG. 1b a timing diagram which represents the waveforms that are present in FIG. 1a at the point designated by the corresponding character. In FIG. 1b, waveform (A) represents the fixed duration sync (Reset) pulse applied to the TTL type 7493 counters at the send end. This pulse is effectively reproduced as waveform (E) in the following manner: The system clock frequency, while not critical, is adjusted to 600 Hz. Two 7493 counters are cascaded, providing output frequencies of 300 Hz (not used), 150 Hz (not used), 75 Hz ($2^0$), 37.5 Hz ($2^1$), 18.75 Hz ($2^2$), 9.375 ($2^3$), and 4.6875 Hz ($2^4$). At the end of frame (EOF) the $2^4$ signal transitions to the low state, initiating the fixed reset pulse in the 74121. This pulse disables the counters, making them passive to the continuing clock. When S2 (DATA ENTER) is momentarily depressed, a 7401 NAND gate, open collector, is enabled, passing the reset pulses to the send Modem where it modulates the clock carrier. The receive Modem demodulates the clock carrier and shapes the pulse, producing waveform (B) in FIG. 1. The delay from (A) to (B) is a function of the combined delays inherent in the equipment and the transmission media propagation delay. The modems in FIG. 1a are to be collocated (back-to-back), thus eliminating media delay. Since the derived clock and system clock are phase locked, the 7493 counters at the demultiplexer have reached EOF ($2^4$ transition to the low state) before pulse (B) appears. Waveform (D) is a composite produced by two NAND gates in a WIRE-OR configuration. The first positive transition of (D) is the inverted EOF transition, clocking the high level at 7474 latch DATA terminal into the latch Q terminal, initiating the positive transition of (E). Subsequently, (B) initiates (C) whose duration is adjustable. When (C) is inverted by the NAND gate, the trailing edge clocks the latch Q terminal back to the low state, enabling the 7493 counters to resume normal operation, fully synchronized with their send-end counterparts.

Turning now to FIG. 2, there is shown the digital to analog conversion (DAC) unit. Both the clock oscillator and the data oscillator perform DAC functions. The oscillator itself is a common Bridge-T sinusoidal oscillator, with frequency a function of the resistance R19 + R20. When the open collector output stage of the NAND gate is in the off state, the impedance seen looking into the collector is relatively large in comparison with the R20 impedance; oscillator frequency $f_o$ is then determined by both R19 and R20. When the NAND output is in the on state, R20 is effectively bypassed by the saturated bipolar transistor and the oscillator frequency shifts to $f_1 > f_o$.

Although the invention has been described with reference to a particular embodiment, it will be understood to those skilled in the art that the invention is capable of a variety of alternative embodiments within the spirit and scope of the appended claims.

What is claimed is:

1. An improved multiplexed data transmission system of the type wherein a plurality of input data signals and a clock signal are frequency division multiplexed for transmission over voice grade transmission circuits, wherein the improvement comprises:
   a delay equalization and frame synchronization apparatus comprising in combination:
   a sending unit for generating a system clock frequency and a plurality of output signals derived from said system clock frequency, said sending unit generating an end of frame signal which initiates a reset pulse, said reset pulse disables the generation of said plurality of output signals and enables a send modem, said send modem modulates said system clock frequency to provide an output FSK signal,
   a receive unit receiving said output FSK signal, said receive unit demodulating said FSK signal to provide a clock carrier and a control pulse, said control pulse is utilized to generate a receive reset pulse, said clock carrier which is phase-locked with said system clock frequency is utilized to provide a plurality of receive output signals upon the occurrence of said receive reset pulse, said plurality of receive output signals and said plurality of output signals in said sending unit being fully synchronized, and,
   a digital to analog converter unit receiving a plurality of digital input signals, said digital to analog converter unit sequentialy sampling said plurality of digital input signals and converting them into serial data, said serial data being applied to a sinusoidal oscillator with a first and second oscillating frequency, said sinusoidal oscillator providing an FSK output signal in response to said serial data.

2. An improved multiplexed data transmission apparatus as described in claim 1 wherein said sending unit comprises in combination:
   a system clock to provide a clock frequency, said clock frequency oscillating at a predetermined frequency,
   a frequency generator receiving said clock frequency to provide a plurality of output frequencies, said plurality of output frequencies each having a different operating frequency, each of said plurality of output frequencies occurring in a predetermined sequence, said frequency generator providing an end of frame signal after each sequence,
   a trigger unit receiving said end of frame signal and providing a reset pulse in response thereto, said reset pulse being applied to said frequency generator,
   a nand gate with an open collector connected to said trigger unit, said nand gate being enabled by said trigger unit to pass said reset pulse, and,
   a modem unit connected to said nand gate to receive said reset signal, said modem unit receiving said clock frequency from said system clock, said modem unit modulating said clock frequency to provide a clock carrier signal, said clock carrier signal being transmitted by said modem unit over a voice-grade transmission line.

3. An improved multiplexed data transmission apparatus as described in claim 1 wherein said digital to analog converter unit comprises in combination:
   a pair of sixteen to one parallel to serial data conversion units, each data conversion units having sixteen input lines and each data conversion units provide a single output line,
   a nand gate receiving each single output line from said pair of data conversion units, each of said data conversion units sequentially strobing data to said nand gate, said nand gate provide a first and second logic signal respectively in response to said data, and, a sinusoidal oscillator providing an FSK output signal in response to said first and second logic signal, said sinusoidal oscillator providing a first oscillating frequency in response to said first logic signal and a second oscillating frequency in response to said second logic signal, said sinusoidal oscillator providing an FSK output signal.

4. An improved multiplexed data transmission apparatus as described in claim 1 wherein said system clock frequency is 600Hz.

5. An improved multiplexed data transmission apparatus as described in claim 2 wherein said frequency generator comprises a pair of cascaded frequency counters to count down said system clock frequency and provide four separate output frequencies, each of said four separate frequencies being a half multiple of the others.

6. An improved multiplexed data transmission apparatus as described in claim 2 further including a switch means connected to said nand gate for manually enabling said nand gate.

* * * * *

UNITED STATES PATENT OFFICE
CERTIFICATE OF CORRECTION

Patent No. 4,121,056             Dated 17 October 1978

Inventor(s) James E. Stout

It is certified that error appears in the above-identified patent and that said Letters Patent are hereby corrected as shown below:

Cover sheet, delete "/73/ Assignee: The United States of America as represented by the Secretary of the Air Force, Washington, D.C."

*Signed and Sealed this*

*Tenth* Day of *July 1979*

[SEAL]

*Attest:*

*Attesting Officer*

LUTRELLE F. PARKER
*Acting Commissioner of Patents and Trademarks*